(12) United States Patent
Allen

(10) Patent No.: US 10,744,473 B2
(45) Date of Patent: Aug. 18, 2020

(54) DUAL GRID CATALYST BASKET AND METHOD OF INDEPENDENTLY SUPPORTING PRIMARY AND SECONDARY CATALYSTS

(71) Applicant: THE ALLOY ENGINEERING COMPANY, Berea, OH (US)

(72) Inventor: F. Burke Allen, Houston, TX (US)

(73) Assignee: THE ALLOY ENGINEERING COMPANY, Berea, OH (US)

( * ) Notice: Subject to any disclaimer, the term of this patent is extended or adjusted under 35 U.S.C. 154(b) by 200 days.

(21) Appl. No.: 15/505,438

(22) PCT Filed: Aug. 17, 2015

(86) PCT No.: PCT/US2015/045544
§ 371 (c)(1),
(2) Date: Feb. 21, 2017

(87) PCT Pub. No.: WO2016/028698
PCT Pub. Date: Feb. 25, 2016

(65) Prior Publication Data
US 2017/0239635 A1      Aug. 24, 2017

Related U.S. Application Data

(60) Provisional application No. 62/039,278, filed on Aug. 19, 2014.

(51) Int. Cl.
*B01J 8/02*      (2006.01)
*C01B 21/28*    (2006.01)
*C01B 21/26*    (2006.01)

(52) U.S. Cl.
CPC ............... *B01J 8/025* (2013.01); *C01B 21/26* (2013.01); *C01B 21/28* (2013.01); *B01J 2208/00814* (2013.01); *B01J 2208/00884* (2013.01)

(58) Field of Classification Search
CPC ... B01J 8/02; B01J 8/025; B01J 8/0446; B01J 8/0449; B01J 8/00884
See application file for complete search history.

(56) References Cited

U.S. PATENT DOCUMENTS

| 4,311,671 A | 1/1982 | Notman |
| 4,743,432 A | 5/1988 | Vollhardt |
| 2016/0200575 A1* | 7/2016 | Olbert ............... B01J 8/008 423/392 |

FOREIGN PATENT DOCUMENTS

| CA | 1 172 832 A1 | 8/1984 |
| CA | 1 225 818 A1 | 8/1987 |
| GB | 1 327 401 A | 8/1973 |

OTHER PUBLICATIONS

PCT/US2015/045544, International Search Report and Written Opinion, dated Jan. 28, 2016.

* cited by examiner

*Primary Examiner* — Jill A Warden
*Assistant Examiner* — Dwayne K Handy
(74) *Attorney, Agent, or Firm* — Fay Sharpe LLP

(57) ABSTRACT

An ammonia oxidation catalyst basket design has two support grids. A first grid supports the primary catalyst and a separate, second grid supports the secondary catalyst. This dual grid design separates the two catalysts, and enables the catalysts to be independent of each other. Any interruption in the primary or the secondary catalyst does not impede or adversely impact on the structure or function of the other catalyst.

17 Claims, 3 Drawing Sheets

DUAL GRID CATALYST BASKET AND METHOD OF INDEPENDENTLY SUPPORTING PRIMARY AND SECONDARY CATALYSTS

This application claims the priority benefit of U.S. Provisional Application Ser. No. 62/039,278, filed Aug. 19, 2014, the entire disclosure of which is incorporated herein by reference.

BACKGROUND

The present disclosure relates to a catalyst basket and associated support method, and more particularly to an improved ammonia oxidation catalyst basket design that has two support grids and a method of independently supporting primary and secondary catalysts.

During the manufacture of nitric acid, significant quantities of pollutants are emitted to the atmosphere. One of the principal pollutants is the greenhouse gas nitrous oxide ($N_2O$). Nitric acid, $HNO_3$, is produced by oxidizing ammonia in the presence of a precious metal catalyst, "primary catalyst". This process produces nitrogen oxides NOX. The main form of the NOx is nitrogen monoxide, NO, that is further processed with water to manufacture nitric acid, $HNO_3$. There is $N_2O$ present in the production of the NOx and takes no further part in the chemistry of the nitric acid process and consequently is emitted to the atmosphere. The $N_2O$ can be reduced greatly by using a "secondary catalyst". The secondary catalyst is typically installed underneath the primary catalyst. As the NOx is produced by the primary catalyst, the NOx passes over the secondary catalyst that selectively destroys the $N_2O$.

The initial process of converting ammonia to NO for the production of $HNO_3$ is facilitated in a piece of equipment called a converter or burner. Inside the converter there is a catalyst containment device generally referred to in the industry as an ammonia oxidation catalyst basket, along with some heat exchange equipment. Historically over the last approximately 60 years, ammonia oxidation catalyst baskets have been designed with a single support grid. The support grid is designed to hold and seal the primary catalyst in position for the ammonia oxidation process. The single support grid design is used for either a direct support of the primary catalyst or as a dual support of a fill material and the primary catalyst. For example, it is known to provide a fill material with the primary catalyst installed on top of the fill material.

With the onset of greenhouse gas reduction requirements for $HNO_3$ production plants, several ways have been proposed to selectively eliminate the $N_2O$. One of those ways has been to replace the fill material in the ammonia oxidation catalyst basket with a secondary abatement catalyst. This method has been proven to work very well in many plants. Unfortunately, these revisions of adding a secondary abatement catalyst to an existing ammonia oxidation catalyst basket design have resulted in process issues.

One of these process issues is known as gapping, i.e., with normal operations of a converter there will be a "gapping" of the secondary catalyst. This gapping forms at the secondary catalyst and at the ammonia oxidation catalyst basket sidewall interface. When this happens there is a preferential flow path that can cause additional issues.

Another process issue is that the abatement catalyst material has been known to compress or become compacted and in doing so reduces the height of the fill. When the height of the fill is reduced, the primary catalyst seal can be interrupted/impacted and causes still other issues.

Still another process issue results from interruptions in the process ("shutting off") called a trip. If there are an unusual number of trips, the secondary catalyst can dome and lift the primary catalyst, and thereby interrupt a seal around the perimeter of the primary catalyst. This consequence can likewise cause additional issues.

As is evident, a need exists to address these issues in an efficient and effective manner, and at a reasonable cost that is easily incorporated into existing design parameters, and that solves these problems and others.

SUMMARY

The present disclosure is directed to an improved ammonia oxidation catalyst basket design that has two support grids.

A first grid supports the primary catalyst and a separate, second grid supports the secondary catalyst.

A main feature of this dual grid design is the separation of the two catalysts. This dual grid design enables the catalysts to be independent of each other. Any interruption in the primary or the secondary catalyst does not impede or adversely impact on the structure or function of the other catalyst.

A primary benefit is that the dual grid design separates the catalysts from each other and allows for these catalysts to perform independently of each other.

A benefit resides in that any movement of the secondary catalyst does not impact the primary catalyst.

Another advantage of the design of the present disclosure is that the primary catalyst remains flat during a campaign cycle and this is important to maintain the seal.

Still other benefits and advantages of the present disclosure will become more apparent from reading and understanding the following detailed description.

DETAILED DESCRIPTION

Figure 1:
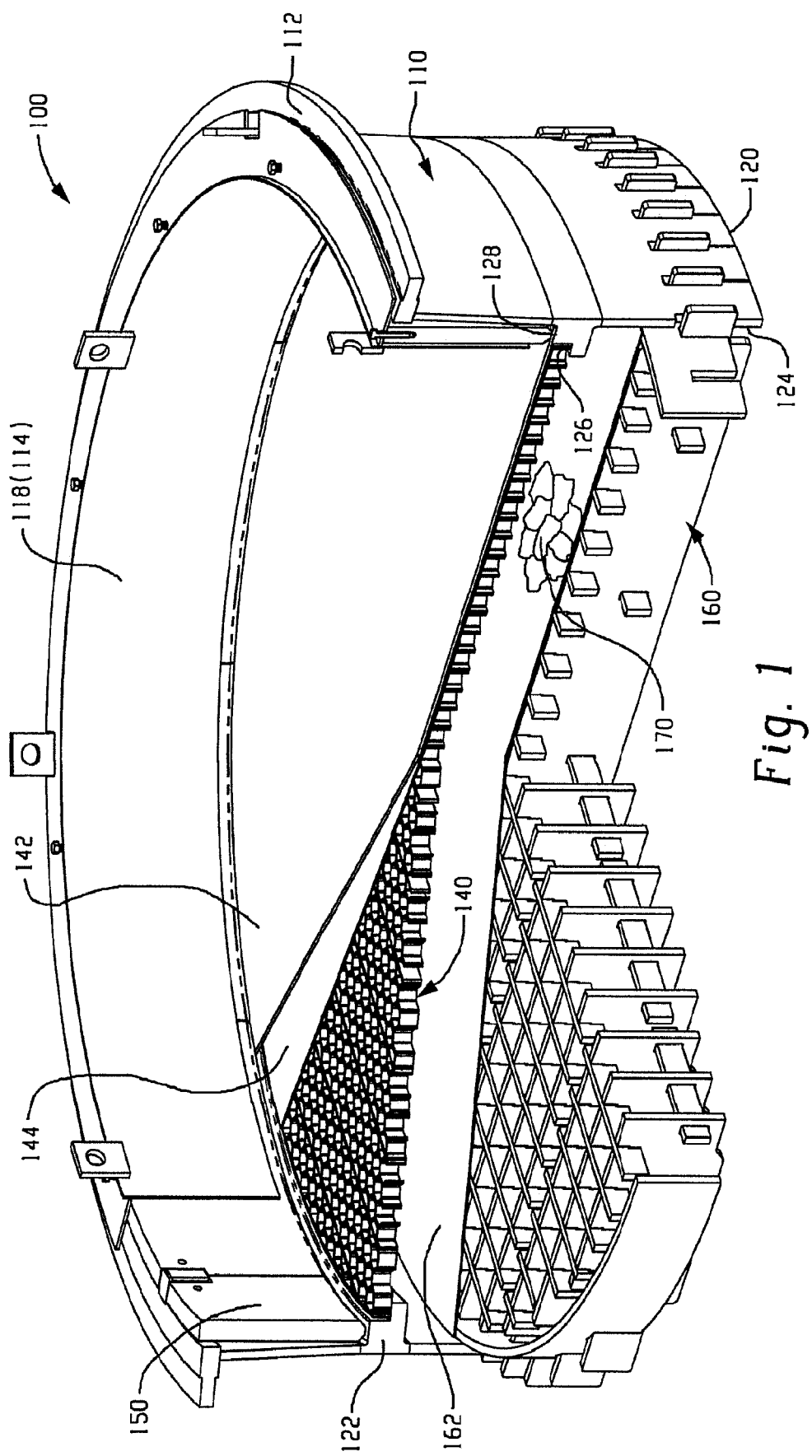
FIG. 1 is a perspective view of a catalyst basket assembly employing the dual grid features of the present disclosure.
Figure 2:
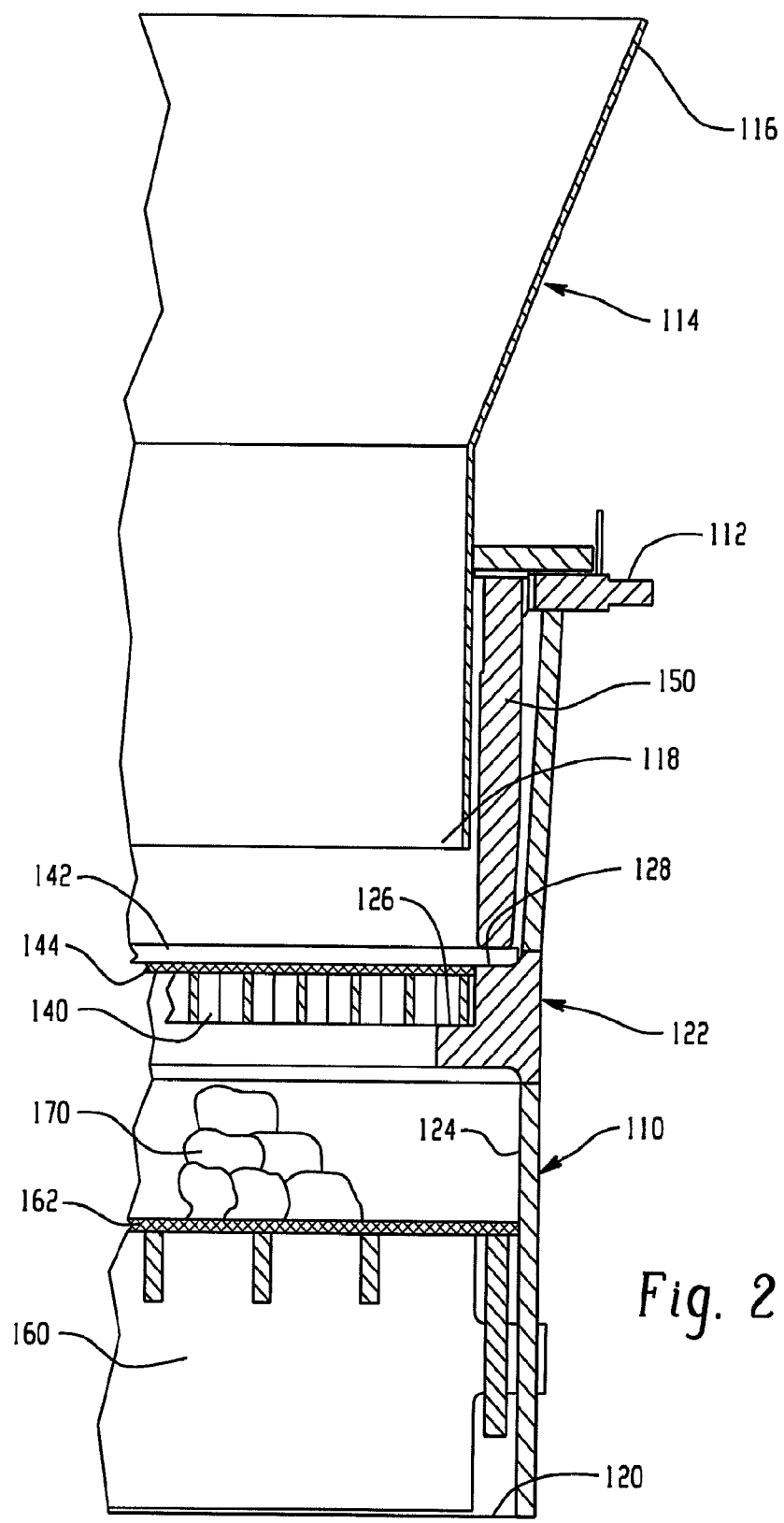
FIG. 2 is an enlarged, partial sectional view through the catalyst basket assembly.
Figure 3:
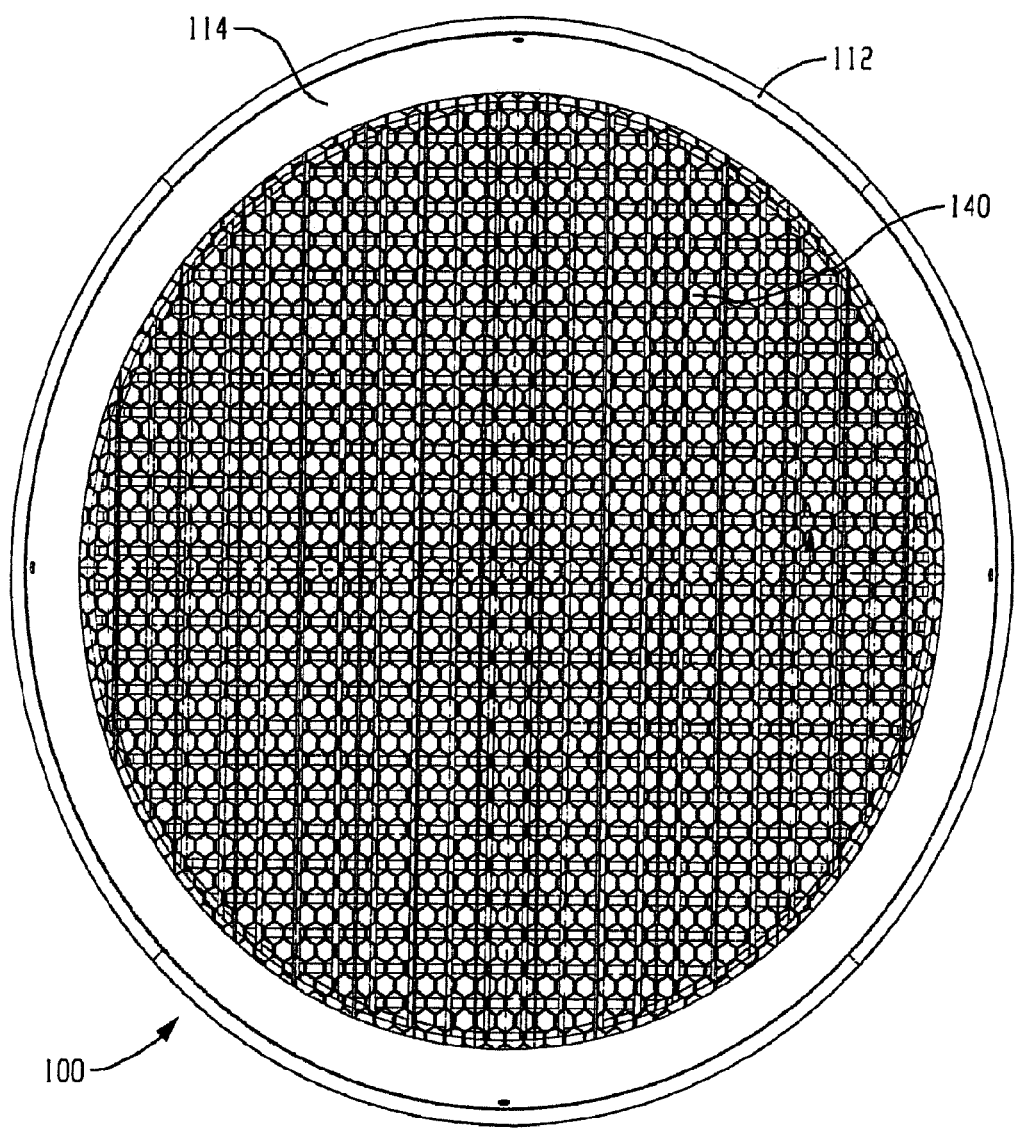
FIG. 3 is a plan view of a first grid that supports a primary catalyst.

Turning to FIGS. 1-3, there is shown in one preferred arrangement of a catalyst basket assembly 100. More specifically, the present disclosure is directed to the dual grid basket 100 that has a housing 110 shown here as a generally circular structure for ease of assembly, although other conformations or configurations of the housing are contemplated without departing from the scope and intent of the present disclosure. Received in a first or upstream portion 112 of the housing 110 is a heat shield 114. For example, the heat shield 114 may include an enlarged, first end 116 (FIG. 2) that tapers inwardly (reduces in cross-sectional dimension) to a generally constant dimension second end 118. The heat shield 114 directs gas flow into the upstream portion 112 of the housing 110 and the gas flow continues down through the housing where the gas flow exits at a second or outlet end 120.

Between the first and second ends 112, 120 of the housing 110, a support flange 122 extends inwardly from an inner perimeter 124 of the housing 110. The support flange 122 has a generally stepped configuration in cross-section that forms first and second perimeter support surfaces 126, 128.

A first support grid 140 is supported along an outer perimeter portion thereof by the first surface 126 of the support flange 122. The first grid 140 is a rigid, foraminous structure (i.e., has a series of openings therethrough) and is shown here as a honeycomb grid although such a description should not be deemed as a limitation on the present disclosure. The first grid 140 supports a primary catalyst 142. One example of a primary catalyst is a platinum gauze that reacts with the gas flow, namely ammonia of a gas flow mixture that may comprise about 13% ammonia and 87% air, although other mixtures and percentages can be used without departing from the cope and intent of the present disclosure. The platinum gauze extends over the entire cross-sectional area or opening through the basket in preferred arrangements. The platinum reacts with the ammonia in the oxidation process.

A mesh screen 144 may also be interposed between the first grid 140 and the primary catalyst 142 to provide further support to the primary catalyst. In addition, a weighted ring 150 is received into the first end 112 of the housing 110, and the weighted ring provides a downward holding force on the primary catalyst 142 and mesh screen 144, that retains the primary catalyst in place on the first support grid 140. More specifically, the weighted ring 150 is dimensioned to engage outer perimeter portions of the primary catalyst 142 and the mesh screen 144, and hold these components against the second surface 128 of the support flange 122. In this manner, the potential for "gapping" to form between the outer perimeter of the primary catalyst and the housing is reduced.

A second support grid 160 is axially spaced (in a direction oriented along the gas flow path through the basket) from the first grid 140 in the housing 110. The second grid 160 and preferably a mesh screen 162 are also foraminous structures that support a secondary catalyst 170, namely a $N_2O$ abatement catalyst. In the illustrated embodiment of the present disclosure, the secondary catalyst 170 is shown as pellets that fill the axial space between the first and second grids. Preferably, the second grid 160 supports the secondary catalyst 170 independently of the primary catalyst 120. By independently supporting the secondary catalyst 170, the improved ammonia oxidation catalyst basket of the present disclosure overcomes many of the issues noted in the Background. The first and second grids separate the catalysts from each other and allow for these catalysts to perform independently of each other. Any movement of the secondary catalyst (i.e., the pellets) does not impact the primary catalyst so that there is less risk of gapping. Another advantage of the design of the present disclosure is that the primary catalyst 142 remains flat during a campaign cycle and this is likewise important to maintain the seal at the perimeter of the primary catalyst.

In summary, the platinum primary catalyst 142 is supported along its outer perimeter and sealed against the housing 110. It is desirable that all of the incoming gas (ammonia and air mixture) flow through the platinum gauze 142. The foraminous structure or first grid 140 is typically placed beneath the platinum gauze 142 to allow the gas to flow therethrough and provide a support surface beneath a central portion of the platinum gauze. A perimeter portion of the platinum gauze 142 is supported on an inner diameter shoulder 128 of the housing 110.

The secondary catalyst 170 or secondary abatement is received on an upper surface of the second grid 160 in axially spaced relation and beneath the platinum gauze 142.

The present disclosure teaches supporting a primary catalyst independently of the secondary catalyst.

The present disclosure finds particular application in high pressure plants, where high pressure may range from approximately 135 to approximately 160 psi (e.g. about 150 psi), and may likewise find application in medium pressure plants where the operating pressure ranges from approximately 50 psi to approximately 100 psi. Again, however, these details are provided for sake of completeness and should not be deemed as a limitation to the present disclosure.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. A catalyst basket for oxidizing an associated mixture of air and ammonia, the catalyst basket comprising:
   a housing having a first, upstream end that receives the associated ammonia communicates with second, outlet end of the housing;
   a support flange extending from the housing between the first end and the second end of the housing;
   a first support grid supported along a perimeter thereof by the support flange of the housing, the first support grid supporting a primary catalyst that includes a primary catalyst for oxidizing the associated ammonia passing from the first end of the housing through the primary catalyst to produce nitrogen oxides (NOx); and
   a separate, second support grid and a mesh screen are mounted to the housing at a spaced location below and downstream of the first support grid, the second support grid and the mesh screen receiving flow from the first support grid and independently supporting a different, secondary catalyst that receives the flow from the first support grid without supporting the primary catalyst and the secondary catalyst limits emissions of nitrous oxide $N_2O$ by interacting with the secondary catalyst, the first support grid positioned between the primary catalyst and the secondary catalyst such that the first support grid is located downstream of the primary catalyst and upstream of the secondary catalyst.

2. The catalyst basket of claim 1 further comprising a mesh screen interposed between the primary catalyst and the first support grid.

3. The catalyst basket of claim 1 wherein the first support grid includes openings that allow gas flow therethrough.

4. The catalyst basket of claim 3 wherein the second support grid includes openings that allow gas flow therethrough.

5. The catalyst basket of claim 1 further comprising a heat shield partially received in the upstream portion of the housing and directing the associated mixture of air and ammonia into the housing.

6. The catalyst basket of claim 5 wherein the heat shield includes a first end that tapers inwardly as the heat shield extends toward the housing.

7. The catalyst basket of claim 1 further comprising a weighted member received in the housing for holding down the primary catalyst against a support surface in the housing.

8. The apparatus of claim 1 wherein the primary catalyst includes platinum.

9. The apparatus of claim 1 wherein the primary catalyst is a platinum gauze.

10. The apparatus of claim 9 further comprising a weighted ring that holds a perimeter portion of the platinum gauze against the support flange.

11. The apparatus of claim 10 wherein the support flange includes a first support surface that supports an outer perimeter portion of the first support grid, and a second support surface that receives an outer perimeter portion of the platinum gauze held against the second support surface by the weighted ring.

12. The apparatus of claim 11 further comprising a second mesh screen interposed between the platinum gauze and the first support grid to provide further support to the platinum gauze.

13. The apparatus of claim 12 wherein the weighted ring additionally holds an outer perimeter portion of the second mesh screen against the second support surface of the support flange.

14. A method of oxidizing an associated mixture of air and ammonia in a catalyst basket, the method comprising:
supplying a housing having an upstream end and an axially spaced downstream end;
mounting a support flange from the housing between the upstream and downstream ends of the housing;
mounting a first support grid via the support flange to the housing for supporting a primary catalyst;
mounting a separate, second support grid to the housing below and downstream of the first support grid, and a mesh screen such that the second support grid and the mesh screen support a secondary catalyst and not supporting the primary catalyst;
positioning the first support grid between the primary catalyst and the secondary catalyst such that the first support grid is located downstream of the primary catalyst and upstream of the secondary catalyst;
feeding the associated mixture of air and ammonia through the primary catalyst for reacting therewith in the oxidizing method; and
directing flow from the primary catalyst through the secondary catalyst.

15. The method of claim 14 wherein the first and second support grids are mounted in spaced relation to independently support the primary and secondary catalysts, respectively.

16. The method of claim 14 further comprising oxidizing the associated ammonia passing from the upstream inlet portion of the housing through the primary catalyst to produce nitrogen oxides (NOx).

17. The method of claim 16 further comprising directing all of the incoming flow of ammonia and air through the primary catalyst.

* * * * *